(12) United States Patent
Ziauddin

(10) Patent No.: US 11,354,310 B2
(45) Date of Patent: Jun. 7, 2022

(54) DUAL PURPOSE ZONE MAPS

(71) Applicant: Oracle International Corporation, Redwood Shores, CA (US)

(72) Inventor: Mohamed Ziauddin, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 565 days.

(21) Appl. No.: 15/987,619

(22) Filed: May 23, 2018

(65) Prior Publication Data

US 2019/0362006 A1 Nov. 28, 2019

(51) Int. Cl.
G06F 16/2453 (2019.01)
G06F 16/22 (2019.01)
G06F 16/2455 (2019.01)

(52) U.S. Cl.
CPC ........ *G06F 16/24542* (2019.01); *G06F 16/22* (2019.01); *G06F 16/2456* (2019.01)

(58) Field of Classification Search
None
See application file for complete search history.

(56) References Cited

U.S. PATENT DOCUMENTS

| | | |
|---|---|---|
| 5,850,547 A | 12/1998 | Waddington et al. |
| 6,408,310 B1 | 6/2002 | Hart |
| 6,529,896 B1 | 3/2003 | Leung |
| 6,882,993 B1 | 4/2005 | Lawande et al. |
| 9,477,702 B1 * | 10/2016 | Ramachandran ... G06F 16/2393 |
| 9,569,490 B1 * | 2/2017 | Kalarikal Janardhana ................. G06F 16/221 |
| 9,659,039 B2 | 5/2017 | Ziauddin et al. |
| 2001/0013030 A1 | 8/2001 | Colby |
| 2002/0029207 A1 * | 3/2002 | Bakalash ................ G06F 16/30 |
| 2004/0064466 A1 | 4/2004 | Manikutty |

(Continued)

OTHER PUBLICATIONS

Oracle. "Create Materialized Zonemap". Oracle Database Online Documentation 12c Release (12.1). Aug. 4, 2017 snapshot via Archive.org. URL Link: <https://docs.oracle.com/database/121/SQLRF/statements_6004.htm>. Accessed Jun. 2020. (Year: 2017).*

(Continued)

*Primary Examiner* — Irene Baker
(74) *Attorney, Agent, or Firm* — Hickman Becker Bingham Ledesma LLP

(57) ABSTRACT

Techniques are provided for using of zone maps to improve the performance of a much wider range of queries than those for which zone maps are currently used. Specifically, techniques are provided for using zone maps to improve performance of queries by providing aggregate values for a wide range of aggregate operations, including SUM, AVG, etc., providing aggregate values for aggregate queries that specify filter conditions, distinguishing between situations in which the aggregate values for a zone are invalid for pruning purposes and when the aggregate values are invalid for query-answering purposes, determining when aggregate values may be used in multi-table zone maps where the type of join specified by a query differs from the type of join used to generate the aggregate values in the zone map, and selecting among different aggregate values for the same zone based on the type of join specified in a query.

40 Claims, 4 Drawing Sheets

SALES TABLE 100

| Item | SaleAmount | SaleDate | Store | |
|---|---|---|---|---|
| ITEM1 | $100 | 1/1/18 | STORE2 | ZONE1 |
| ITEM4 | $300 | 1/2/18 | STORE1 | |
| *** | *** | *** | *** | |

| Item | SaleAmount | SaleDate | Store | |
|---|---|---|---|---|
| ITEM3 | $200 | 1/2/18 | STORE2 | ZONE2 |
| ITEM2 | $600 | 1/5/18 | STORE3 | |
| *** | *** | *** | *** | |

| Item | SaleAmount | SaleDate | Store | |
|---|---|---|---|---|
| ITEM2 | $600 | 1/3/18 | STORE1 | ZONE3 |
| ITEM4 | $300 | 1/12/18 | STORE5 | |
| *** | *** | *** | *** | |

ZONE MAP 102

| ZONE | SumOfSales | MINSaleDate | MAXSaleDate | VALID FOR PRUNING? | VALID FOR AGGREGATION? |
|---|---|---|---|---|---|
| ZONE1 | $5200 | 1/1/18 | 2/28/18 | YES | YES |
| ZONE2 | $7500 | 10/10/17 | 11/5/17 | YES | YES |
| ZONE3 | $4000 | 5/5/17 | 2/2/18 | YES | YES |

(56) References Cited

U.S. PATENT DOCUMENTS

| | | | |
|---|---|---|---|
| 2004/0122814 | A1 | 6/2004 | Zhang |
| 2005/0010564 | A1* | 1/2005 | Metzger .............. G06F 16/2282 |
| 2005/0038784 | A1 | 2/2005 | Zait |
| 2006/0122964 | A1 | 6/2006 | Yu |
| 2006/0212436 | A1 | 9/2006 | Gupta et al. |
| 2006/0253429 | A1 | 11/2006 | Raghavan |
| 2007/0050391 | A1 | 3/2007 | Chatterjee |
| 2007/0078813 | A1 | 4/2007 | Beavin |
| 2007/0233637 | A1* | 10/2007 | Corvinelli ........... G06F 16/2462 |
| 2008/0059408 | A1 | 3/2008 | Barsness |
| 2008/0098045 | A1 | 4/2008 | Radhakrishnan |
| 2008/0120275 | A1 | 5/2008 | Cruanes et al. |
| 2008/0201296 | A1 | 8/2008 | Yu |
| 2008/0275840 | A1 | 11/2008 | Burger et al. |
| 2009/0018992 | A1 | 1/2009 | Zuzarte |
| 2009/0019005 | A1 | 1/2009 | Hu |
| 2009/0019103 | A1* | 1/2009 | Tommaney ....... G06F 16/24532 709/201 |
| 2009/0319477 | A1 | 12/2009 | Idicula |
| 2010/0169302 | A1 | 7/2010 | Lopes |
| 2010/0235344 | A1 | 9/2010 | Chandrasekar |
| 2010/0235348 | A1 | 9/2010 | Baby |
| 2010/0281017 | A1 | 11/2010 | Hu |
| 2012/0054248 | A1 | 3/2012 | Mehrotra et al. |
| 2012/0109888 | A1 | 5/2012 | Zhang |
| 2012/0117054 | A1 | 5/2012 | Shrinivas |
| 2012/0290588 | A1 | 11/2012 | Egan |
| 2012/0303621 | A1 | 11/2012 | Newnham et al. |
| 2012/0311241 | A1 | 12/2012 | Lee |
| 2013/0246484 | A1 | 9/2013 | Stolte |
| 2014/0095472 | A1 | 4/2014 | Lee |
| 2015/0006509 | A1 | 1/2015 | Shao |
| 2015/0088812 | A1* | 3/2015 | Ziauddin ................. G06F 16/21 707/609 |
| 2015/0186493 | A1 | 7/2015 | Balmin et al. |
| 2015/0286681 | A1* | 10/2015 | Baer ................. G06F 16/24554 707/754 |
| 2015/0363447 | A1* | 12/2015 | Dickie .............. G06F 16/24557 707/696 |
| 2016/0078064 | A1 | 3/2016 | Sassin |
| 2016/0162548 | A1* | 6/2016 | Dickie .............. G06F 16/90335 707/714 |
| 2016/0162599 | A1* | 6/2016 | Dickie ................ G06F 16/9017 707/769 |
| 2016/0253379 | A1* | 9/2016 | Ford .................... G06F 16/2453 707/721 |
| 2017/0116267 | A1* | 4/2017 | Boehme ............ G06F 16/24557 |
| 2017/0177667 | A1* | 6/2017 | Boehme ............ G06F 16/24544 |
| 2018/0246950 | A1* | 8/2018 | Arye ................ G06F 16/24554 |
| 2018/0260439 | A1* | 9/2018 | Beier ................ G06F 16/24542 |
| 2018/0300350 | A1* | 10/2018 | Mainali ................. G06F 16/134 |
| 2019/0163771 | A1* | 5/2019 | Kirk ..................... G06F 16/2237 |
| 2019/0236192 | A1* | 8/2019 | Zou ................... G06F 16/24554 |

OTHER PUBLICATIONS

Ziauddin, U.S. Appl. No. 15/638,226, filed Jun. 29, 2017, Office Action, dated Oct. 17, 2019.

Kimball et al. "The Data Warehouse Toolkit: The Complete Guide to Dimensional Modeling", (2nd edition), John Wiley & Sons, Inc., New York, 2002, 449 pages.

Abadi D. J., Madden S. R., Hachem N., Columnstores vs. RowStores: How Different Are They Really? SIGMOD, 2008, 14 pages.

Abadi D. J., Myers D.S., DeWitt D. J., Madden S.R. Materialization Strategies in a Column-Oriented DBMS. Proceedings of ICDE, 2007, 11 pages.

Battacharjee et al., "Efficient Query Processing for Multi-Dimensionally Cluster Tables in DB2", Proceedings dated 2003, VLDB Conference, dated Jan. 1, 2013, 12 pages.

Bellamkonda S., Ahmed R., et al. Enhanced Subquery Optimizations in Oracle. Proceedings of the VLDB Endowment, 2009, 12 pages.

Bello, R. G., et al. Materialized Views in Oracle, Proceedings of the VLDB Endowment, 1998, 6 pages.

Bernstein, P. A., Chiu, D. W. Using semi-joins to solve relational queries. Journal of the ACM, 28(1), pp. 25-40, 1981.

Bloom, B. "Space/Time Trade-offs in Hash Coding with Allowable Errors". Communications of the ACM, 13(7), pp. 422-426, 1970.

Brimingham, "Zone Maps and Data Power", IBM Netezza Underground Blogs, dated Jul. 11, 2011, 7 pages.

A Technical Overview of Oracle Exadata Database Machine and Exadata Storage Server. Oracle White Paper, Jun. 2012 36 pages.

IBM Netezza Data Warehouse Appliance. http://www-01.IBM.com/software/data/netezza/, last viewed on Aug. 21, 20017, 3 pages.

Weininger, A. Efficient execution of joins in a star schema. SIGMOD, pp. 542-545, dated 2002, 4 pages.

Mukherjee, N., et al. "Distributed Architecture of Oracle Database In-memory". Proceedings of the VLDB Endowment, 2015, 12 pages.

Netezza Zone Maps. http://www-01.ibm.com/support/knowledgecenter/SSULQD_7.2.0/com.ibm.nz.adm.doc/c_sysadm_zone_maps.html, 2 pages, last viewed on Aug. 21, 2017.

O'Neil, P., O'Neil, B., Chen, X. Star Schema Benchmark. http://www.cs.umb.edu/~poneil/StarSchemaB.PDF, dated Jun. 5, 2009, 10 pages.

Oracle Database In-Memory. Oracle White Paper, Jul. 2015. http://www.oracle.com/technetwork/database/in-memory/overview/twp-oracle-database-in-memory-2245633.html, 43 pages.

Oracle Partitioning with Oracle Database 12c. Oracle White Paper, Sep. 2014, 16 pages.

Schneider, D. A., DeWitt, D. J. Tradeoffs in processing complex join queries via hashing in multiprocessor database machines. Proceedings of the VLDB Endowment, 1990, 12 pages.

Smart Scans Meet Storage Indexes. Oracle Magazine, May/Jun. 2011. http://www.oracle.com/technetwork/issue-archive/2011/11-may/o31exadata-354069.html, 4 pages.

Warren, H. S. Hacker's Delight, Addison-Wesley. 2002. p. 244.

Ceri, S., Negri, M., Pelagatti, G. Horizontal Data Partitioning in Database Design, SIGMOD, pp. 128-136, 1982.

U.S. Appl. No. 14/245,934, filed Apr. 4, 2014, Office Action, dated Mar. 17, 2016.

U.S. Appl. No. 14/245,934, filed Apr. 4, 2014, Notice of Allowance, dated Jul. 25, 2016.

U.S. Appl. No. 14/245,909, filed Apr. 4, 2014, Office Action, dated Mar. 22, 2016.

U.S. Appl. No. 14/245,909, filed Apr. 4, 2014, Notice of Allowance, dated Jul. 27, 2016.

Ziauddin, U.S. Appl. No. 15/638,226, filed Jun. 29, 2017, Notice of Allowance, dated Apr. 10, 2020.

U.S. Appl. No. 14/0333,380, filed Sep. 20, 2013, Office Action, dated Apr. 22, 2016.

U.S. Appl. No. 14/033,380, filed Sep. 20, 2013, Office Action, dated Jun. 12, 2015.

U.S. Appl. No. 14/033,380, filed Sep. 20, 2013, Notice of Allowance, dated Oct. 4, 2016.

U.S. Appl. No. 14/033,380, filed Sep. 20, 2013, Interview Summary, dated Jul. 25, 2016.

U.S. Appl. No. 14/033,380, filed Sep. 20, 2013, Final Office Action, dated Nov. 16, 2015.

Chakkappen, U.S. Appl. No. 16/147,521, filed Sep. 28, 2018, Office Action, dated Jul. 17, 2020.

Dunn et al., "Sequenced Subset Operators: Definition and Implementation", Data Engineering, dated 2002, Proceedings, 18th International Conference on IEEE, 2002, pp. 81-92

Ziauddin, U.S. Appl. No. 17/068,357, filed Oct. 12, 2020, Non-Final Rejection, dated Mar. 14, 2022.

* cited by examiner

SALES TABLE 100

| Item | SaleAmount | SaleDate | Store |
|---|---|---|---|
| ITEM1 | $100 | 1/1/18 | STORE2 |
| ITEM4 | $300 | 1/2/18 | STORE1 |
| *** | *** | *** | *** |

⎫ ZONE1

| Item | SaleAmount | SaleDate | Store |
|---|---|---|---|
| ITEM3 | $200 | 1/2/18 | STORE2 |
| ITEM2 | $600 | 1/5/18 | STORE3 |
| *** | *** | *** | *** |

⎫ ZONE2

| Item | SaleAmount | SaleDate | Store |
|---|---|---|---|
| ITEM2 | $600 | 1/3/18 | STORE1 |
| ITEM4 | $300 | 1/12/18 | STORE5 |
| *** | *** | *** | *** |

⎫ ZONE3

ZONE MAP 102

| ZONE | SumOfSales | MINSaleDate | MAXSaleDate | VALID FOR PRUNING? | VALID FOR AGGREGATION? |
|---|---|---|---|---|---|
| ZONE1 | $5200 | 1/1/18 | 2/28/18 | YES | YES |
| ZONE2 | $7500 | 10/10/17 | 11/5/17 | YES | YES |
| ZONE3 | $4000 | 5/5/17 | 2/2/18 | YES | YES |

FIG. 1

DUAL PURPOSE ZONE MAPS

FIELD OF THE INVENTION

The present invention relates to zone maps and, more specifically, to avoiding the need to scan all rows of a zone by using aggregate values from zone maps to generate results for aggregate operations.

BACKGROUND

Within a database system, a table may be divided into zones, and metadata may be maintained about the values in each zone. The metadata for the zones is collectively referred to as a "zone map". The metadata in a zone map may be used by a database server to more efficiently process queries that target the table for which the zone map was generated.

For example, assume that a table "emp" has been divided into 3 zones (Z1, Z2 and Z3). Each zone corresponds to a distinct set of contiguous rows. Further assume that table "emp" has an "age" column, and that the zone map keeps track of the MIN and MAX ages for each zone. For example, within Z1 the lowest value in the age column may be 18, while the highest value is 70. Within Z2 the lowest and highest age values may be 25 and 35, respectively. Within Z3 the lowest and highest age values may be 37 and 57, respectively.

One use of zone maps is to prune zones from consideration. For example, assume that the database server receives a query with the predicate "where age=50". By inspecting the zone map, the database server is able to determine that it is impossible for Z2 to have any row that satisfies that predicate (50 is higher than the maximum age (35) within Z2). Consequently, when processing the query, the database server will only scan the zones Z1 and Z3. In this example, zone Z2 is considered "pruned" from consideration. One technique for pruning based on zone map information is described in U.S. Pat. No. 9,507,825.

In addition to MIN and MAX, zone maps may also indicate the number of rows in each zone. For example, the zone map for table "emp" may indicate that zones Z1, Z2 and Z3 have 50, 75 and 201 rows, respectively. At least one existing system aggregates the row counts contained in the zone map to answer queries that ask how many rows are in the entire table (e.g. SELECT COUNT(*) FROM emp).

It is desirable to provide techniques for making use of zone maps to improve the performance of a much wider range of queries than those for which zone maps are currently used.

BRIEF DESCRIPTION OF THE DRAWINGS

In the drawings:

FIG. 1 is a block diagram of a table for which a zone map has been created, according to an embodiment;

DETAILED DESCRIPTION

Figure 2:
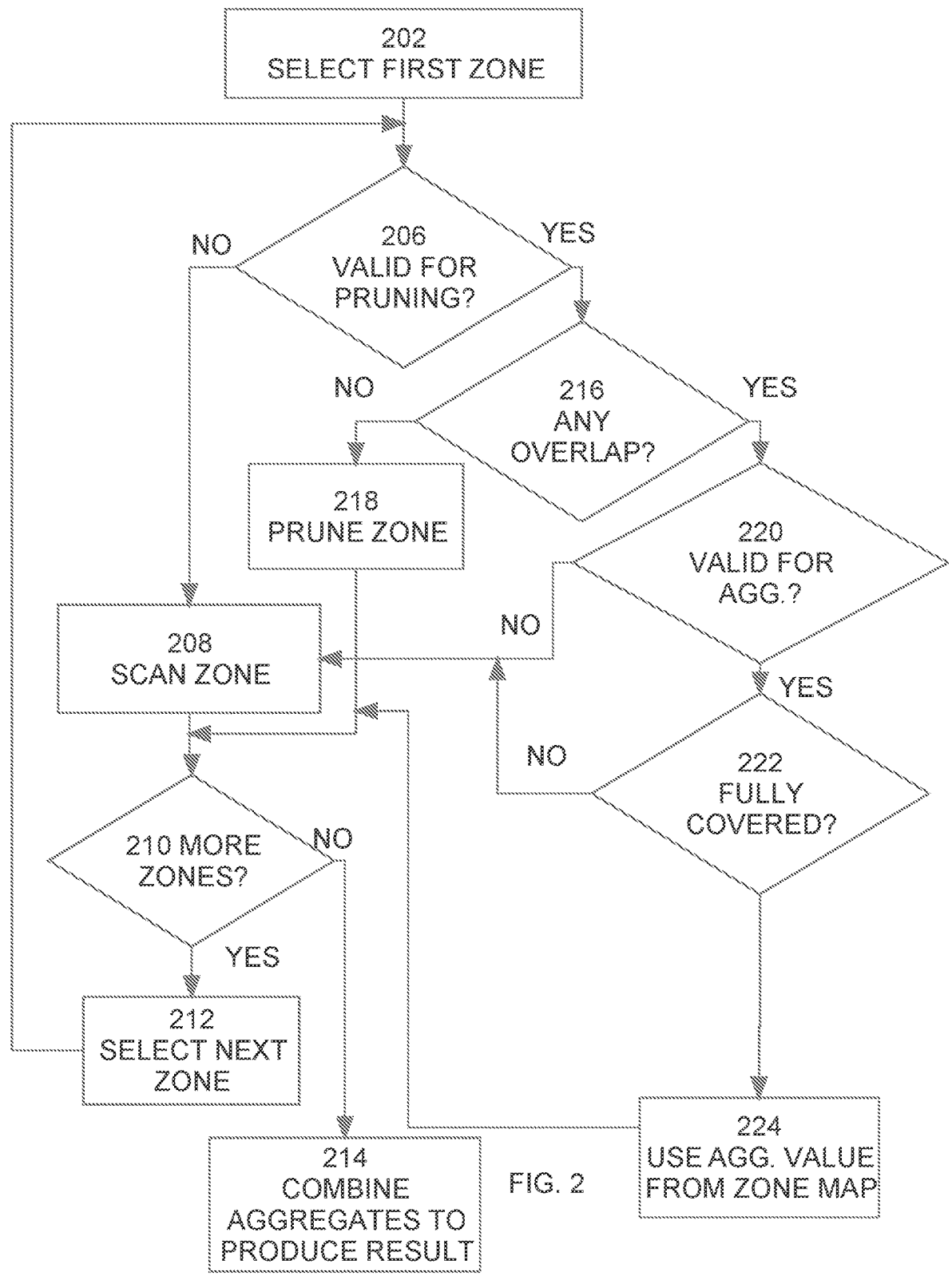
FIG. 2 is a flowchart for determining how to use zone map aggregate values to answer a query that contains filter criteria, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for using of zone maps to improve the performance of a much wider range of queries than those for which zone maps are currently used. Specifically, techniques are provided for using zone maps to improve performance of queries by:

- providing aggregate values for a wide range of aggregate operations, including SUM, AVG, etc.
- providing aggregate values for aggregate queries that specify filter conditions
- distinguishing between situations in which the aggregate values for a zone are invalid for pruning purposes and when the aggregate values are invalid for query-answering purposes
- determining when aggregate values may be used in multi-table zone maps where the type of join specified by a query differs from the type of join used to generate the aggregate values in the zone map
- selecting among different aggregate values for the same zone based on the type of join specified in a query Example Zone Map Referring to FIG. 1, it is a block diagram of a table 100 for which a Zone Map 102 has been created, according to an embodiment. Sales Table 100 has been divided into three zones (Zone1, Zone2, Zone3). Zone map 102 contains various pieces of information for each of the zones of table 100. In the illustrated embodiment, Zone Map 102 includes a SumOfSales column that indicates the sum of SaleAmount values in all rows in each of the zones of table 100. Zone map 102 also includes a column (MINSaleDate) that indicates, for each zone of table 100, the earliest date in the SaleDate column. Zone map 102 also includes a column (MAXSaleDate) that indicates, for each zone of table 100, the latest date in the SaleDate column. Zone map 102 also includes a column entitled "valid for pruning?" and a column entitled "valid for aggregation?". These last two columns shall be described in greater detail hereafter.

It should be noted that a zone map may have many more columns than those shown in FIG. 1. For example, the zone map may include a RowCount for each zone to indicate how many rows are in the zone, and a CountOfSales for each zone to indicate how many rows with non-NULL values are in the zone. The zone map may also include, for each zone, the MIN and MAX values from many columns. The zone map may also include, for each zone, the SUM of values for each of multiple columns.

Providing Aggregate Values for Aggregate Queries

As mentioned above, systems currently are able to sum the row count values stored in the zone map of a table to quickly determine the total number of rows in the table. For example, the query "SELECT count(*) FROM T" can be answered by summing the per-zone row count values that are stored in the zone map of T. However, using the techniques described herein, zone maps may be used to provide aggregate values for a much wider range of queries. For example, as illustrated in FIG. 1, Zone Map 102 includes SumOfSales for each zone of Sales Table 100. Consequently, a query that specifies "SELECT Sum(SaleAmount) FROM Sales" may be answered by summing the SumOfSales values of each of the zones. In the illustrated embodiment, the database server would simply answer such a query by obtaining the SumOfSales values $5200, $7500 and $4000 directly from Zone Map 102, and summing those values to produce $16,700. Generating the answer to "SELECT Sum(SaleAmount) FROM Sales" in this manner is significantly faster than scanning all rows of Sales Table 100 to obtain the individual SaleAmount values and then summing those values.

In the example given above, the aggregate operation specified in the query is "Sum", and the zone map is populated with the sums of the target column (SaleAmount) for each zone. However, other types of aggregate operations (e.g. MIN, MAX) are supported in a similar manner. In addition, aggregate operations that may be derived from other aggregate values are also supported. For example, if the zone map includes both the SumOfSales and the CountOfSales for each zone, then the SumOfSales and CountOfSales values from the zone map may be used to answer queries that request the average SalesAmount. Specifically, the database server derives the average SalesAmount from the information in the zone map by summing all of the SumOfSales values in the zone map, and dividing that number by the sum of all CountOfSales in the zone map.

Support for Aggregate Queries with Filter Conditions

In all the examples given above, per-zone aggregate values in the zone map are used to answer queries that do not have filter conditions (i.e. queries that select all rows in the base table). However, when a query contains a filter condition, simply aggregating the aggregate values from the zone map will not produce the correct answer because those aggregate values may take into account values from rows that may not satisfy the filter condition.

For example, assume that the database server receives the query "SELECT SUM(SaleAmount) from Sales WHERE SaleDate>=Jan. 1, 2018". In this example, the database server cannot simply sum the SumOfSales values from Zone Map 102 to produce the correct result, because the SumOfSales values are based on all rows in each zone, not just the rows that satisfy the filter condition "SaleDate>=Jan. 1, 2018".

According to one embodiment, the performance of aggregate queries with filter conditions can still be improved by (a) assigning each zone to one of three categories, and (b) processing the zone based on the category to which the zone is assigned. Specifically, the zones are categorized into the categories "no-overlap", "some-overlap" and "total-overlap". The no-overlap zones are zones that cannot possibly have any row that satisfies the filter conditions. The some-overlap zones are zones that may have some rows that satisfy the filter conditions, and some rows that do not. The total-overlap zones are zones where every row is guaranteed to satisfy the filter conditions.

For the purpose of explanation, assume that the database server that manages Sales Table 100 receives the query "SELECT SUM(SaleAmount) from Sales WHERE SaleDate>=Jan. 1, 2018". To categorize the zones of Sales Table 100, the database server compares the filter conditions to the SaleDate ranges of each zone. The SaleDate ranges are specified by the MINSaleDate and MAXSaleDate values stored in Zone Map 102. In the present example, the SaleDate range for Zone1 is Jan. 1, 2018 to Feb. 28, 2018. Every value in this range satisfies the filter conditions SaleDate>=Jan. 1, 2018, so the database server would categorize Zone1 as "total-overlap".

The SaleDate range for Zone2 is Oct. 19, 2017 to Nov. 5, 2017. None of the values in this range can possibly satisfy the filter conditions SaleDate>=Jan. 1, 2018, so the database server would categorize Zone2 as "no-overlap".

The SaleDate range for Zone3 is May 5, 2017 to Feb. 2, 2018. Some of the values in this range satisfy the filter conditions SaleDate>=Jan. 1, 2018, and some do not. Consequently, the database server would categorize Zone3 as "some-overlap".

As mentioned above, the zones for each category are handled differently by the database server. Specifically, "no-overlap" zones are "pruned". That is, their SumOfSales values are not taken into account in the aggregate value generated to answer the query.

On the other hand, for "total-overlap" zones, the database server obtains the applicable aggregate values from the Zone Map 102 without having to scan those zones of the Sales Table 100.

For "some-overlap" zones, the database server does not use the aggregate values from the Zone Map 102. The database server obtains those aggregate values some other way, such as by scanning the rows from Sales Table 100, applying the filter conditions thereto, and aggregating the values from the rows that satisfy the filter conditions.

Returning to the present example, to process the query "SELECT SUM(SaleAmount) from Sales WHERE SaleDate>=Jan. 1, 2018", for Zone1 the database server obtains the SumOfSales value ($5200) from Zone Map 102. For Zone2, the database server ignores the SumOfSales value ($7500) from Zone Map 102. For Zone3, the database server scans the actual rows from Sales Table 100, filters out the rows that do not satisfy the filter conditions "SaleDate>=Jan. 1, 2018", sums the SalesAmount for those rows, and adds that sum to the SumOfSales value ($5200) of Zone1. For the purpose of explanation, assume that the rows in Zone3 that satisfy the condition "SaleDate>=Jan. 1, 2018" have SaleAmount values that sum to $3500. Under these circumstances, the database server would return the value $8700 ($5200 for the rows of Zone1 plus $3500 for the rows of Zone3).

It should be noted that, although in this example the database server needed to scan the actual rows of some zones, the query would still execute much faster than would occur using conventional techniques. The improved processing speed results because, for all "total-overlap" zones, the database server is able to obtain the needed aggregate values from the zone map, and the database server is able to skip over (prune) all rows of the "no-overlap" zones.

Maintaining the Zone Map

According to one embodiment, zone maps are maintained in sync with the table to which they correspond. In such an embodiment, deletions, additions and updates to rows in a zone would cause aggregate values for that zone to be updated. For example, if a row is deleted from Zone1, then (a) the RowCount for Zone1 would be decremented by 1, and (b) the SaleAmount from the deleted row would be subtracted from the SumOfSales value for Zone1. Similarly, if a row is inserted into Zone1, then (a) the RowCount for Zone1 would be incremented by 1, and (b) the SaleAmount from the new row would be added to the SumOfSales value for Zone1. In addition, it may also be necessary to adjust the MINSaleDate or the MAXSaleDate for Zone1.

Unfortunately, the overhead of maintaining zone maps in sync may outweigh the performance benefit provided by the zone maps. Therefore, in an alternative embodiment, rather than maintain a zone map in sync with its associated base table, metadata is added to the zone map to indicate, on a per-zone basis, when the information in the zone map is "stale/invalid".

According to the embodiment illustrated in FIG. 1, a zone map maintains two per-zone staleness indicators: one for indicating whether the zone map information for the zone is stale/invalid for the purposes of zone pruning, and another for indicating whether the zone map information for the zone is stale/invalid for the purposes of answering a query with aggregation values from the zone map.

When a zone map is initially built, all values in the zone map reflect the current state of the underlying base table. Consequently, both "valid for pruning?" and "valid for aggregation?" are initially set to "YES" for each zone. When a row is inserted into a zone, or a row within the zone is updated, then both the "valid for pruning?" and "valid for aggregation?" indicators are set to "NO". However, when a row is deleted from a zone, the "valid for aggregation?" is set to "NO" but the "valid for pruning?" is not changed. The reason that "valid for pruning?" can remain "YES" for a zone after the deletion of a row in the zone is that deletions can never expand the range covered by the MIN and MAX values for the zone.

Thus, to the extent that a deletion would affect this range, it would only be to shrink the range. The fact that a zone covers a smaller range than actually indicated by the MIN and MAX values will never lead to the pruning of a zone that should not have been pruned. It could only lead to the failure to prune a zone that could actually have been pruned. Failure to prune a zone that could have been pruned is not ideal, but the answer produced by the query being processed will still be correct.

According to one embodiment, not all updates result in the invalidation of the zone map information for the zone. Instead, the database server determines whether an update could actually affect the zone map information. If the update is only to columns that do not affect the zone map information, then the update does not cause the zone to be marked as invalid. In the example illustrated in FIG. 1, an update that only affects the "Item" column of the Sales Table 100 would not affect any information in Zone Map 102, and therefore would not cause the corresponding zone to be marked as "invalid" for either "pruning" or "aggregation" purposes.

Example Process Flow

FIG. 2 is a flowchart illustrating how a database server may process a query that specifies an aggregation operation along with filter conditions. For the purpose of explanation, it shall be assumed that the database server that manages Sales Table 100 receives the query "SELECT SUM(SaleAmount) from Sales WHERE SaleDate>=Jan. 1, 2018".

Referring to FIG. 2, at step 202 the database server selects the first zone to process. For the purpose of illustration, it shall be assumed that the database server initially selects Zone1. Control then proceeds to step 206.

At step 206, the database server determines whether the zone map information for the current zone is valid for making a pruning decision. Zone1's "Valid for Pruning?" value is "yes", so control proceeds to step 216. If Zone1 had not been valid for pruning, then control would have passed to step 208 and the rows of Zone1 would have been scanned from Sales Table 100.

At step 216, the database server determines whether there is any overlap between (a) the filter conditions specified in the query and (b) the MIN/MAX range associated with the current zone. In the present example, Zone1 is a "total-overlap" zone for the filter condition "SaleDate>=Jan. 1, 2018", so control passes to step 220.

At step 220, it is determined whether the current zone is valid for providing aggregation results. Zone1's "Valid for Aggregation?" value is "yes", so control proceeds to step 222. If the current zone is not valid for providing aggregation results, then control would pass to step 208 and the rows of Zone1 would have been scanned from Sales Table 100.

At step 222, the database server determines whether the currently-selected zone is fully covered by the filter condition. Zone1 is a "total-overlap" zone for the filter condition "SaleDate>=Jan. 1, 2018", so control passes to step 224. If the current zone is not a total-overlap zone, then control would pass to step 208, and the rows of Zone1 would have been scanned from Sales Table 100.

At step 224, the database server obtains the appropriate aggregate value, for the current zone, from the zone map. In the present example, the database server would obtain the SumOfSales value for Zone1 ($5200) from Zone Map 102. Control then passes to step 210 to determine whether more zones need to be processed. In the present example, Zone2 and Zone3 have not yet been processed, so control passes to step 212.

At step 212, the database server selects the next zone (Zone2), and control passes back to step 206. At step 206, the database server determines whether the zone map information for the current zone is valid for making a pruning decision. Zone2's "Valid for Pruning?" value is "yes", so control proceeds to step 216.

At step 216, the database server determines whether there is any overlap between the filter conditions specified in the query, and the rows in the current zone. In the present example, Zone2 is a "no-overlap" zone for the filter condition "SaleDate>=Jan. 1, 2018", so control passes to step 208 and Zone2 is "pruned".

Control then passes to step 210 to determine whether more zones need to be processed. In the present example, Zone3 has not yet been processed, so control passes to step 212. At step 212, the database server selects the next zone (Zone3), and control passes back to step 206.

At step 206, the database server determines whether the zone map information for the current zone is valid for making a pruning decision. Zone1's "Valid for Pruning?" value is "yes", so control proceeds to step 216. If Zone1 had not been valid for pruning, then control would pass to step 208 and the rows of Zone1 would have been scanned from Sales Table 100.

At step 216, the database server determines whether there is any overlap between the filter conditions specified in the query, and the rows in the current zone. In the present example, Zone2 is a "some-overlap" zone for the filter condition "SaleDate>=Jan. 1, 2018", so control passes to step 220.

At step 220, it is determined whether the current zone is valid for providing aggregation results. Zone3's "Valid for Aggregation?" value is "yes", so control proceeds to step 222.

At step 222, the database server determines whether the currently selected zone is fully covered by the filter condition. Zone3 is a "some-overlap" zone for the filter condition "SaleDate>=Jan. 1, 2018", so control passes to step 208 and the rows of Zone3 are scanned from Sales Table 100.

Control then passes to step 210 to determine whether more zones need to be processed. In the present example, all zones have been processed, so control passes to step 214 and the aggregate values that were obtained for Zone 1 (from the zone map) and Zone3 (from the Sales Table) are combined to produce the final aggregate value required by the query. The database server then returns the query results to the database client that issued the query.

Join Zone Maps

In the examples given thus far, the zone map is generated based on a single table. However, it is possible for zone maps to be generated based on joins between multiple tables. Such zone maps are referred to herein as "join zone maps". Techniques for generating join zone maps are described, for example, in U.S. patent application Ser. No. 15/638,226, the contents of which are incorporated herein by reference.

Similar to single-table zone maps, per-zone aggregate values may be stored in a join zone map, and then used both for zone pruning (for "no-overlap" zones) and for answering queries without scanning a zone's rows (for "total-overlap" zones). However, providing aggregate values from a join zone map is complicated by the fact that the type of join may affect the aggregate values. For example, assume that a join zone map is created based on a join between the following two tables, where "store ID" is the join key:

TABLE A (ZONE 1)

| STORE ID | SALE AMOUNT | DATE |
|---|---|---|
| 1 | $10 | Jan. 1, 2018 |
| 1 | $12 | Jan. 1, 2018 |
| 2 | $8 | Jan. 2, 2018 |
| 2 | $16 | Jan. 3, 2018 |
| 1 | $2 | Jan. 5, 2018 |

TABLE A (ZONE 2)

| STORE ID | SALE AMOUNT | DATE |
|---|---|---|
| 5 | $6 | Nov. 11, 2017 |
| 3 | $8 | Nov. 12, 2017 |
| 3 | $10 | Nov. 13, 2017 |
| 4 | $12 | Dec. 12, 2017 |
| 5 | $14 | Jan. 5, 2018 |

TABLE B

| STORE ID | STATE | MANAGER |
|---|---|---|
| 1 | CA | BOB |
| 2 | CA | SALLY |
| 3 | WI | KIM |
| 4 | NY | LUCY |

In join zone map tables, the zone map may include MIN/MAX values for columns from the base table, for columns from the dimension tables, or both. For example, the join zone map for a join between Table A and Table B may include the following:

ZONE MAP 1 (LEFT OUTER join)

| | ZONE 1 | ZONE 2 |
|---|---|---|
| SumOfSales | $48 | $50 |
| MinDate | Jan. 1, 2018 | Nov. 11, 2017 |
| MaxDate | Jan. 5, 2018 | Jan. 5, 2018 |
| MinState | CA | CA |
| MaxState | NY | WI |

As illustrated, Zone Map 1 includes MIN/MAX values for the Date column of the base table (Table A), and MIN/MAX values for the State column of the dimension table (Table B). Zone Map 1 also has the SumOfSales value for each zone.

The SumOfSales values contained in Zone Map 1 were generated by performing a LEFT OUTER join between Table A and Table B. In LEFT OUTER joins, all rows from the left-hand table (Table A) are returned by the join whether or not those rows join with the right-hand table (Table B). Consequently, the SumOfSales values in Zone Map 1 are the per-zone sums of all "Sale Amount" values in Table A.

In contrast, INNER joins only return those rows from the left-hand table that actually join to a row from the right-hand table. In the present example, the right-hand table does not include any row with Store ID=5. Thus, two rows of Zone 2 would not be included in the results produced by an INNER join. Thus, a join zone map for an INNER join between tables A and B would contain the values in ZONE MAP 2:

ZONE MAP 2 (INNER join)

| | ZONE 1 | ZONE 2 |
|---|---|---|
| SumOfSales | $48 | $30 |
| MinDate | Jan. 1, 2018 | Nov. 12, 2017 |
| MaxDate | Jan. 5, 2018 | Dec. 12, 2017 |
| MinState | CA | CA |
| MaxState | NY | WI |

In Zone Map 2, the SumOfSales value for zone 2 ($30) differs from the SumOfSales value for Zone 2 in Zone Map 1 (50) because zone map 2 is based on an inner join and therefore does not take into account the rows of Table A that do not join with any row of Table B (i.e. the rows where Store ID is 5). As is also evident by this example, the absence of those rows in the join results can also affect other statistics maintained in the zone map. For example, the MaxDate value for Zone 2 changed (from Jan. 5, 2018 to Dec. 12, 2017) due to the change from a LEFT-OUTER JOIN to an INNER join.

Join Zone Maps that Support Multiple Types of Joins

As explained above, the values in a join zone map are join-type-specific. That is, the aggregate values generated for a join zone map may change based on whether the join upon which those aggregate values are based is a LEFT OUTER join or an INNER join. One way for a single zone map to be used in conjunction with both types of joins is to generate a zone map that includes aggregate values for each type of join. For example, a join zone map for a join between tables A and B may include:

| ZONE MAP 3 (MULTIPLE JOIN TYPES) | | |
| --- | --- | --- |
| | ZONE 1 | ZONE 2 |
| (LOJ) SumOfSales | $48 | $50 |
| (LOJ) MinDate | Jan. 1, 2018 | Nov. 11, 2017 |
| (LOJ) MaxDate | Jan. 5, 2018 | Jan. 5, 2018 |
| (LOJ) MinState | CA | CA |
| (LOJ) MaxState | NY | WI |
| (IJ) SumOfSales | $48 | $30 |
| (IJ) MinDate | Jan. 1, 2018 | Nov. 12, 2017 |
| (IJ) MaxDate | Jan. 5, 2018 | Dec. 12, 2017 |
| (IJ) MinState | CA | CA |
| (IJ) MaxState | NY | WI |

A zone map, such as Zone Map 3, that stores aggregate values for multiple join-types (e.g. LEFT OUTER join (LOJ) and INNER join (IJ)) may be used by the database server to prune and/or answer queries involving either join type. Thus, for the query "SELECT SUM(Sales) FROM A LEFT OUTER join B WHERE Date<Jan. 1, 2018" the database server would use MaxDate Jan. 5, 2018 to determine whether Zone 2 can be pruned, and the SumOfSales $50 if Zone 2 were fully covered (which it is not).

On the other hand, for the query "SELECT SUM(Sales) FROM A INNER join B WHERE Date<Jan. 1, 2018" the database server would use MaxDate Dec. 12, 2017 to determine whether Zone 2 can be pruned, and the SumOfSales $30 if Zone 2 were fully covered (which it is).

In Zone Map 3, aggregate values for each join type are stored within the zone map. However, join zone maps may involve joins between the base table and any number of dimension tables, and the number of possible join-type combinations escalates quickly with the number of dimension tables involved in the join. For example, a join between base Table A and N dimension tables produces $2^N$ possible join-type combinations.

Consequently, when more than one dimension table is involved in the join used to generate a join zone map and/or the number of aggregate values maintained in the join zone map is relatively high, it may not be efficient to store, in the join zone map, aggregate values for each possible join-type combination. Therefore, as shall be explained in greater detail hereafter, rather than store aggregate values for each possible join-type combination, aggregate values may be stored for a single type of join, and additional metadata is maintained on a per-zone basis to indicate whether those aggregate values are also valid for other join-types.

Storing Anti-Join Counts in Zone Maps

Left-hand table rows that do not join with a right-hand table are referred to as "anti-join rows". For any given (zone/dimension table) combination, the number of rows in the zone that do not join with the dimension table is that zone's "anti join row-count" for that dimension table. When the anti-join row-count for a (zone/dimension table) combination is zero, the aggregate values produced by a LEFT-OUTER JOIN between the zone's rows and the dimension table are the same as those produced by an INNER join between the zone's rows and the dimension table.

Returning to the example given above, the anti-join row-count for the (Zone 1/Table B) combination is zero, because all rows in Zone 1 of Table A join to some row in Table B. Consequently, as illustrated in Zone Map 3, the LEFT OUTER join (LOJ) aggregate values for Zone 1 are identical to the INNER join (IJ) aggregate values for Zone 1.

In contrast, the anti-join row-count for the (Zone 2/Table B) combination is 2, because two rows in Zone 2 of Table A specify a Store ID of 5, which does not match any Store ID in Table B. Consequently, it is possible for the LEFT OUTER join (LOJ) aggregate values for Zone 2 to differ from the INNER join (IJ) aggregate values for Zone 2. In fact, the SumOfSales, MinDate, and MaxDate for Zone 2 all change based on the type of join.

According to one embodiment, rather than use the join zone map to store aggregate values for each possible combination of join-types, the database server simply stores in the join zone map aggregates values for one type of join. In addition to those aggregate values, the database server stores in the join zone map the anti join row-count for each (zone/dimension table) combination.

For example, assume that the join zone map for the join between Tables A and B is generated based on a LEFT OUTER join. The resulting zone map would be Zone Map 1, set forth above. To that zone map may be added the anti join row-counts for each zone relative to Table B, as illustrated in Zone Map 4:

| ZONE MAP 4 (LEFT OUTER join) | | |
| --- | --- | --- |
| | ZONE 1 | ZONE 2 |
| SumOfSales | $48 | $50 |
| MinDate | Jan. 1, 2018 | Nov. 11, 2017 |
| MaxDate | Jan. 5, 2018 | Jan. 5, 2018 |
| MinState | CA | CA |
| MaxState | NY | WI |
| Anti-Join Row-Count(Table B) | 0 | 2 |

Because the Anti-Join Row-Count for (Zone 1/Table B) is zero, the database server is able to use the aggregate values for Zone 1 for both (a) queries that join A to B using a LEFT OUTER join, and (b) queries that join A to B using an INNER join. In contrast, because the Anti-Join Row-Count for (Zone 2/Table B) is not zero, the database server is able to use the aggregate values for Zone 2 for queries that join A to B using a LEFT OUTER join, but not for queries that join A to B using an INNER join.

A single row may be added to the zone map for each additional table to which the base table is joined. For example, a join zone map that is based on LEFT OUTER joins between Table A and each of tables B, C, and D may be:

| ZONE MAP 5 (LEFT OUTER join) | | |
| --- | --- | --- |
| | ZONE 1 | ZONE 2 |
| SumOfSales | $48 | $50 |
| MinDate | Jan. 1, 2018 | Nov. 11, 2017 |
| MaxDate | Jan. 5, 2018 | Jan. 5, 2018 |
| MinState | CA | CA |
| MaxState | NY | WI |
| Anti-Join Row-Count(Table B) | 0 | 2 |
| Anti-Join Row-Count(Table C) | 1 | 0 |
| Anti-Join Row-Count(Table D) | 0 | 1 |

Based on the anti join row-count values stored in Zone 5, the database server is able to determine, for a query having any given combination of join-types, whether the aggregate values in the zone map may be used to prune/answer queries. In the present example, an INNER join with Table B would prevent use of the aggregate values in Zone 2. An INNER join with Table C would prevent use of the aggregate values in Zone 1. An INNER join with Table D would prevent use of the aggregate values in Zone 2.

In Zone Maps 4 and 5, it was assumed that the zone map's aggregate values were generated based on LEFT OUTER joins between the relevant tables. Consequently, the Anti-Join Row-Counts were used to determine whether the zone map's aggregate values could be used for queries involving INNER joins. However, the aggregate values for a zone map may instead be generated based on INNER joins between the relevant tables. When such is the case, the Anti-Join Row-Counts are used by the database server to determine whether the zone map's aggregate values could be used for queries involving LEFT OUTER joins. When the aggregate values in a join zone map are based on inner joins with all dimension tables, if a zone has any anti join row for any dimension tables, then the aggregate values for the zone cannot be used for queries that do not also have inner joins with those dimension tables. It should be noted that zone MIN/MAX for pruning purpose can be computed using left outer joins to all dimension tables to ensure all base table rows are used in computing these aggregates.

Processing Aggregate Queries with Non-Matching Join-Types

Figure 3:
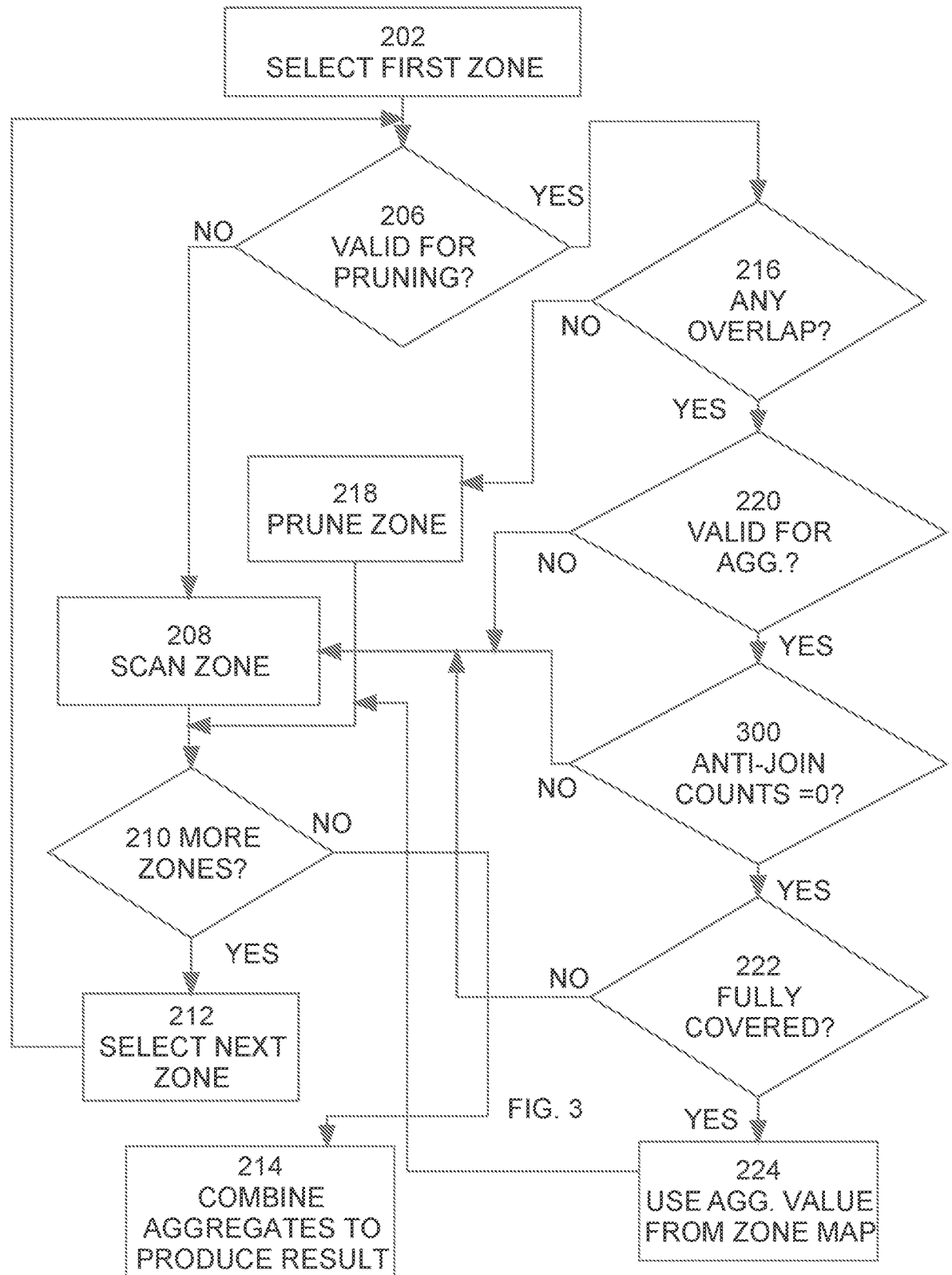
FIG. 3 is the flowchart of FIG. 2 with an additional step for checking whether aggregate values in a join zone map may be used when a query specifies a type of join that differs from the type of join used to generate the aggregate values in the map table.

FIG. 3 is a flowchart for processing aggregate queries with non-matching join-types, according to an embodiment. A query has a "non-matching join-type" when the query joins a base table of a join zone map (e.g. Table A) with another table (e.g. Table B, C or D) using a join-type that is different than the join-type that was used between those two tables to generate the aggregate values in the join zone map.

For example, assume that Table A is the base table of join zone map 5 (depicted above). Assume that the aggregate values in the join zone map 5 are generated based on LEFT OUTER joins between Table A and Tables B, C and D. Because all joins are LEFT OUTER joins, the aggregate values for each zone will be based on all rows in the zone (whether or not they join any of the other tables).

Assume that the database server receives a query Q1 that specifies LEFT OUTER joins between Table A and Tables B and C, and an INNER join between Table A and Table D. Under these circumstances, the INNER join between Tables A and D is a non-matching join-type. Because the per-zone aggregate values in the join zone map reflect all rows in each zone, the aggregate values in the join zone map can only be used to answer Q1 for those zones where all rows in the zone join with rows in Table D. Stated another way, the aggregate values that the zone map has for a zone can only be used if the anti join row-count, for that zone, for Table D, is zero.

Referring to FIG. 3, queries that have non-matching join-types are processed in a manner similar to the flowchart illustrated in FIG. 2. However, FIG. 3 has an additional test (step 300) that must be satisfied before the database server will use the aggregate values for the current zone to answer the query. Specifically, in step 300, it is determined, for the table involved in each non-matching join-type, whether the zone's anti join row-count for the table is zero. In query Q1, the only non-matching join-type is the INNER join with Table D. Therefore, if the anti join row-count for Table D for the current zone is 0, then control can proceed from step 300 to step 222. Otherwise, the aggregate values for the zone cannot be used, and control passes to step 208 where the zone's rows are scanned. Based on the anti join row-counts for Table D that are in Zone Map 5, control would pass from step 300 to step 222 for Zone 1 (where Table D has an anti join row-count of 0), while control would pass from step 300 to step 208 for Zone 2 (where Table D has an anti join row-count of 1).

Rewriting Queries to Use Zone Maps

One way that a database server can answer an aggregate query using aggregate values from a zone map involves rewriting queries to cause them to obtain aggregate values from the zone map. For example, consider the following zone map (cust_zmap) created by the following Data Definition Language statement (DDL):

CREATE MATERIALIZED ZONEMAP cust_zmap AS
SELECT SYS_OP_ZONE_ID(rowid), MIN(cust_city) min_cust_city,
MAX(cust_city) max_cust_city
FROM customers
GROUP BY SYS_OP_ZONE_ID(rowid);

Here, SYS_OP_ZONE_ID is a function that divides up the customers table data into zones of blocks (and hence rows) that are next to each other on disk. Each zone is typically made of 1024 data blocks, but it can be less or greater.

In one embodiment, in addition to the MIN and MAX aggregates specified in the "create zone map DDL", some auxiliary aggregate columns are transparently added by the database server to be part of the zone map. According to one embodiment, the transparently added aggregate columns include:
  COUNT(*) aggregate stored in a column named zone_rows$,
  current state of individual zone in a column named zone_state$ (0 signifies fresh zone, 1 signifies stale zone), and
  level of aggregation in a column named zone_level$ (0 signifies aggregates per zone, 1 signifies aggregates per table partition).

If the base table (i.e. the "customers" table) is partitioned, then zone level as well as partition level aggregates are stored in the zone map. Because each partition is made up of distinct set of zones, the zone level aggregates are rolled up to derive the partition level aggregates.

Consider the following user query that counts the number of customers:
SELECT COUNT(*) AS num_cust FROM customers;

If the information stored in cust_zmap is fresh for all zones and complete (i.e. there are no missing zones), then the above query can be simply rewritten to scan cust_zmap instead of customers table as follows:
SELECT NVL(SUM(zone_rows$), 0) AS num_cust FROM cust_zmap;

If the information stored in cust_zmap is stale for some zones or it is incomplete (e.g. zone map is not refreshed after loading new table data so it is missing some zone information), then the above query can be rewritten to use cust_zmap as well as scan some zones of the customers table, as shown below:

SELECT ( ( SELECT NVL(SUM(zone_rows$), 0) FROM cust_zmap
WHERE zone_state$ = 0 ) +
   ( SELECT COUNT(*) FROM customers WHERE
   ZMAP_DATA_PRUNING_FUNC(cust_zmap,
   'skip_fresh') )

```
         ) AS num_cust
FROM sys.dual;
```

The internal function ZMAP_DATA_PRUNING_FUNC performs data pruning according to its argument value. In the above rewritten query, this function uses cust_zmap to skip over no-overlap zones of the customers table that are fresh.

Based on the rewritten query, COUNT(*) is derived from (a) fresh zones in the zone map and (b) scanning customers data pertaining to the stale or missing zones. In the rewritten query, the second inner SELECT computes COUNT(*) of customers table rows that belong to zones that are either stale or missing from the zone map.

A query that contains a filter condition on one of the min/max columns in the zone map can also be rewritten to make use of the zone map. Consider the following query:
SELECT COUNT(*) AS num_cust FROM customers WHERE cust_city='Rome';

This query can be rewritten using the zone map for the dual purposes of data pruning and aggregate computation as follows:

```
SELECT ( ( SELECT NVL(SUM(zone_rows$), 0) FROM
      customers_zmap
      WHERE zone_state$ = 0 AND min_cust_city = 'Rome' and
      max_cust_city = 'Rome') +
        ( SELECT COUNT(*) FROM customers
          WHERE ZMAP_DATA_PRUNING_FUNC(cust_zmap,
          'skip_fresh_full_overlap', 'skip_fresh_non_overlap',
          'Rome', 'Rome' )
        ) AS num_cust
      FROM sys.dual;
```

In the above rewritten query, the arguments to ZMAP_DATA_PRUNING_FUNC indicate to skip over the total-overlap zones of the customers table that are fresh and fully include the predicate value range (i.e. from 'Rome' to 'Rome') as well as the no-overlap zones that are fresh and fully exclude the predicate value range. The second inner SELECT in the above rewritten query computes COUNT(*) of the rows belonging to stale zones, missing zones, and fresh zones that partially overlap with the predicate value range.

Rewriting Queries to Use Join Zone Maps

Similar to single-table queries that specify aggregation operations, user queries that contain joins can be rewritten to use join zone maps. Consider the following join zone map:

```
CREATE MATERIALIZED ZONEMAP sales_joinzmap AS
SELECT SYS_OP_ZONE_ID(s.rowid), MIN(c.cust_city)
   min_cust_city, MAX(c.cust_city) max_cust_city,
   SUM(s.amount_sold) sum_amount_sold
FROM sales s, customers c
WHERE s.cust_id = c.cust_id (+)
GROUP BY SYS_OP_ZONE_ID(s.rowid);
```

Consider the following join query:

```
SELECT SUM(s.amount_sold) AS total_amount FROM sales s,
   customer c WHERE s.cust_id = c.cust_id
   AND c.cust_city = 'Rome';
```

This join query can be rewritten to make use of the join zone map as follows:

```
SELECT ( ( SELECT SUM(sum_amount_sold) FROM sales_joinzmap
WHERE zone_state$ = 0 AND aj_count$ = 0 AND min_cust_city =
'Rome' and max_cust_city = 'Rome' ) +
   ( SELECT SUM(amount_sold) FROM sales s, customers c
   WHERE s.cust_id = c.cust_id AND
   ZMAP_DATA_PRUNING_FUNC(sales_joinzmap,
   'skip_fresh_full_overlap_inner', 'skip_fresh_non_overlap_inner',
   'Rome', 'Rome' )
   ) AS total_amount
FROM sys.dual;
```

The first inner SELECT computes total amount from the join zone map by summing the SUM aggregates belonging to fresh total-overlap zones having zero anti join rows. Column aj_count$ in sales_joinzonemap records the number of anti join rows formed when rows from an individual zone are outer-joined to the customers table. This column is transparently added to the join zone map by the database server. When aj_count$ is 0, it signifies s.cust_id=c.cust_id (+) in the join zone map definition to be equivalent to s.cust_id=c.cust_id in the user query. The second inner SELECT computes total amount from the inner join of customers table rows with sales rows belonging to stale zones, missing zones, some-overlap zones, and zones with aj_count$>0.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
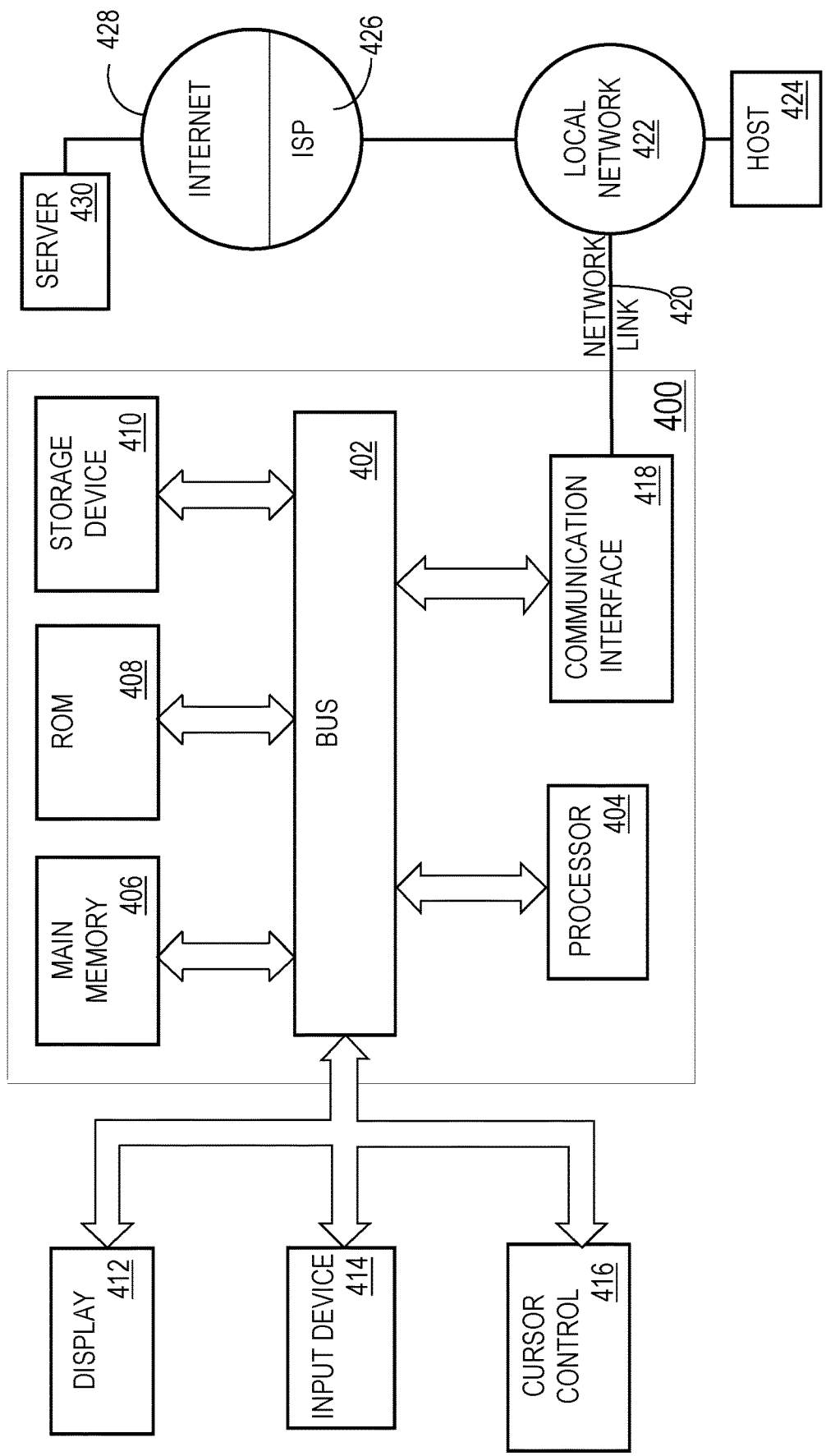
FIG. 4 is a block diagram of a computer system upon which embodiments of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for improving performance of query processing in a database system based on zone map information, comprising:
   dividing, into a plurality of zones, a base table that is managed by a database server;
   wherein said dividing is based on locations, in persistent storage, of rows of the base table;
   wherein the base table has a particular column;
   generating, for the base table, a zone map;
   wherein generating the zone map includes, for each zone of the plurality of zones, storing in the zone map a per-zone aggregate value that is one of:
      a sum value that reflects a sum of values, from the particular column, from rows belonging to said each zone,
      a min value that reflects a minimum value, from the particular column, from rows belonging to said each zone, or
      a max value that reflects a maximum value, from the particular column, from rows belonging to said each zone;
   wherein one or more zones, of the plurality of zones, are marked as stale based on one or more pruning staleness indicators;
   processing, by the database server, a query that requires generation of a target aggregation of values from the particular column;
   wherein said processing the query comprises:
      while the one or more zones are marked as stale based on the one or more pruning staleness indicators:
         determining that at least one zone, of the plurality of zones, is not stale based on at least one aggregation staleness indicator, and
         responsive to said determining that the at least one zone is not stale, deriving the target aggregation of values from at least one per-zone aggregate value, for the at least one zone of the plurality of zones, obtained from the zone map; and
   wherein the method is performed by one or more computing devices.

2. The method of claim 1 wherein:
   the at least one per-zone aggregate value comprises a particular per-zone sum value that reflects a sum of values, from the particular column, from rows belonging to an associated zone of the plurality of zones; and
   the target aggregation of values is a target sum of values from the particular column.

3. The method of claim 2 wherein the query includes a filter condition and the method further comprises:
   determining, based on the filter condition, that a first zone of the plurality of zones is a no-overlap zone;
   determining, based on the filter condition, that a second zone of the plurality of zones is a total-overlap zone;
   wherein the particular per-zone sum value reflects a sum of values from rows belonging to the second zone;
   pruning the first zone responsive to determining that the first zone is a no-overlap zone; and
   wherein deriving the target aggregation of values from the particular column comprises using the particular per-zone sum value of the second zone to derive the target sum of values responsive to determining that the second zone is a total-overlap zone.

4. A method for improving performance of query execution in a database system based on zone map information, comprising:
   dividing, into a plurality of zones, a base table that is managed by a database server;
   wherein the base table has a particular column;
   generating, for the base table, a zone map;
   wherein generating the zone map includes, for each zone of the plurality of zones, storing in the zone map a per-zone aggregate value;
   wherein the per-zone aggregate value is one of:
      a sum value that reflects a sum of values, from the particular column, from rows belonging to the zone,
      a min value that reflects a minimum value, from the particular column, from rows belonging to the zone, or
      a max value that reflects a maximum value, from the particular column, from rows belonging to the zone;
   receiving, by the database server, a query that (a) includes a filter condition, and (b) requires generation of a target aggregation of values from the particular column; and in response to receiving the query, deriving the target aggregation of values from the particular column comprising:
  determining, based on the filter condition, that a first zone of the plurality of zones is a total-overlap zone;
  determining, based on the filter condition, that a second zone of the plurality of zones is a some-overlap zone;
  responsive to determining that the second zone is a some-overlap zone, scanning rows of the second zone to compute a particular per-zone aggregate value for values in the particular column for the second zone; and
  based, at least in part, on said determining that the first zone is a total-overlap zone, combining the per-zone aggregate value of the first zone with at least the particular per-zone aggregate value for the second zone to derive the target aggregation of values;
wherein the method is performed by one or more computing devices.

5. The method of claim 2 further comprising:
maintaining, for each zone of the plurality of zones, validity data that indicates both:
  whether information for said each zone in the zone map, is valid with respect to pruning decisions; and
  whether per-zone sum values for said each zone, in the zone map, are valid for deriving aggregate values to answer queries.

6. The method of claim 5 further comprising:
responsive to a row being inserted into a first zone of the plurality of zones, updating the validity data to indicate that information in the zone map for the first zone is invalid both with respect to pruning decisions and for deriving aggregate values to answer queries; and
responsive to a row being deleted from a second zone of the plurality of zones, updating the validity data to indicate that information in the zone map for the second zone is invalid for deriving aggregate values to answer queries, but not with respect to pruning decisions.

7. The method of claim 6 wherein the at least one of the plurality of zones includes only those zones, of the plurality of zones, (a) that are total-overlap zones, and (b) for which validity data indicates the per-zone sum values are valid for deriving aggregate values to answer queries.

8. A method for improving performance of query processing in a database system based on zone map information, comprising:
dividing, into a plurality of zones, a base table that is managed by a database server;
wherein said dividing is based on locations, in persistent storage, of rows of the base table;
generating, for the base table, a zone map;
wherein generating the zone map includes, for each zone of the plurality of zones, storing in the zone map:
  per-zone range information; and
  a per-zone aggregate value;
storing, for each zone of the plurality of zones, at least two per-zone staleness indicators comprising:
  a pruning staleness indicator indicating whether the zone map includes stale range information for said each zone, and
  an aggregation staleness indicator indicating whether the zone map includes a stale aggregation value for said each zone;
wherein each zone of one or more zones, of the plurality of zones, is marked as stale by at least one staleness indicator of the at least two per-zone staleness indicators for said each zone;
processing, by the database server, a query that targets the base table and requires generation of a target aggregate value;
wherein the query specifies a filter condition;
wherein said processing the query comprises:
  while the one or more zones are marked as stale:
    determining that a particular zone, of the plurality of zones, is not stale based on a particular aggregation staleness indicator for the particular zone,
    using the per-zone range information in the zone map to determine that all of the rows, in the particular zone of the plurality of zones, satisfy the filter condition, and
    responsive to said determining that the particular zone is not stale and responsive to determining that all of the rows in the particular zone satisfy the filter condition, deriving the target aggregate value from the per-zone aggregate value, for the particular zone, obtained from the zone map;
wherein the method is performed by one or more computing devices.

9. A method for improving performance of query execution in a database system based on zone map information, comprising:
dividing, into a plurality of zones, a base table that is managed by a database server;
generating, for the base table, a zone map;
wherein generating the zone map includes, for each zone of the plurality of zones, storing in the zone map:
  per-zone range information, and
  a per-zone aggregate value;
receiving, by the database server, a query that targets the base table and requires generation of a target aggregate value;
wherein the query specifies a filter condition;
in response to the query, using the per-zone range information in the zone map to determine that a first zone of the plurality of zones is a total-overlap zone relative to the filter condition;
determining, based on the filter condition and the per-zone range information in the zone map, that a second zone of the plurality of zones is a some-overlap zone;
responsive to determining that the second zone is a some-overlap zone, scanning rows of the second zone to compute a particular per-zone aggregate value for the second zone; and
deriving the target aggregate value based, at least in part, on the per-zone aggregate value, for the first zone, obtained from the zone map and the particular per-zone aggregate value for the second zone;
wherein the method is performed by one or more computing devices.

10. The method of claim 8 wherein the target aggregate value is a sum of values from a particular column of the base table.

11. The method of claim 8 wherein the target aggregate value is one of:
a minimum value from a particular column of the base table; or
a maximum value from the particular column of the base table.

12. The method of claim 8 wherein the target aggregate value is an average of values from a particular column of the base table.

13. The method of claim 8 wherein the target aggregate value is a count of rows, from the base table, that satisfy the filter condition.

14. A method for improving performance of query execution in a database system based on zone map information, comprising:
dividing, into a plurality of zones, a base table that is managed by a database server;
generating, based on a join between the base table and one or more dimension tables, a join zone map;
wherein the one or more dimension tables include a particular dimension table;
wherein generating the join zone map includes, for each zone of the plurality of zones, storing in the join zone map:
a left-outer-join per-zone aggregate value produced by performing a particular type of aggregation operation on values from a particular column of the base table from rows that are produced by a left-outer-join between the base table and the particular dimension table; and
an inner-join per-zone aggregate value produced by performing the particular type of aggregation operation on values from the particular column of the base table from rows that are produced by an inner-join between the base table and the particular dimension table;
receiving, by the database server, a query that:
specifies a particular type of join between the base table and the particular dimension table; and
requires generation of a target aggregate value based on the particular type of aggregation operation on values from the particular column of the base table from rows that are produced by the particular type of join between the base table and the particular dimension table;
responsive to the particular type of join being a left outer join, deriving the target aggregate value based, at least in part, on the left-outer-join per-zone aggregate value of at least one zone of the plurality of zones;
responsive to the particular type of join being an inner join, deriving the target aggregate value based, at least in part, on the inner-join per-zone aggregate value of at least one zone of the plurality of zones;
wherein the method is performed by one or more computing devices.

15. A method for improving performance of query execution in a database system based on zone map information, comprising:
dividing, into a plurality of zones, a base table that is managed by a database server;
generating, based on a join between the base table and one or more dimension tables, a join zone map;
wherein the one or more dimension tables include a particular dimension table;
wherein generating the join zone map includes, for each zone of the plurality of zones, storing in the join zone map:
a per-zone aggregate value produced by performing a particular type of aggregation operation on values from a particular column of the base table from rows that are produced by a first type of join between the base table and the particular dimension table; and
a per-zone anti-join row-count value that indicates how many rows of the base table, in the zone, do not combine with rows from the particular dimension table;
receiving, by the database server, a query that:
specifies a second type of join between the base table and the particular dimension table, wherein the second type of join is a different type of join than the first type of join; and
requires generation of a target aggregate value based on the particular type of aggregation operation on values from the particular column of the base table from rows that are produced by the second type of join between the base table and the particular dimension table;
for each zone of the plurality of zones, determining whether the per-zone aggregate value for the zone may be used to produce the target aggregate value based, at least in part, on whether the per-zone anti join row-count value for the zone is zero;
wherein, of the per-zone aggregate values stored in the join zone map, only the per-zone aggregate values for zones, of the plurality of zones, where the per-zone anti-join row-count value is zero are used to produce the target aggregate value required by the query;
wherein the method is performed by one or more computing devices.

16. The method of claim 15 wherein the first type of join is a left outer join and the second type of join is an inner join.

17. The method of claim 15 wherein the first type of join is an inner join and the second type of join is a left outer join.

18. One or more non-transitory computer-readable media storing instructions for improving performance of query processing in a database system based on zone map information, the instructions comprising instructions that, when executed by one or more computing devices, cause:
dividing, into a plurality of zones, a base table that is managed by a database server;
wherein said dividing is based on locations, in persistent storage, of rows of the base table;
wherein the base table has a particular column;
generating, for the base table, a zone map;
wherein generating the zone map includes, for each zone of the plurality of zones, storing in the zone map a per-zone aggregate value that is one of:
a sum value that reflects a sum of values, from the particular column, from rows belonging to said each zone,
a min value that reflects a minimum value, from the particular column, from rows belonging to said each zone, or
a max value that reflects a maximum value, from the particular column, from rows belonging to said each zone,
wherein one or more zones, of the plurality of zones, are marked as stale based on one or more pruning staleness indicators;
processing, by the database server, a query that requires generation of a target aggregation of values from the particular column; and
wherein said processing the query comprises:
while the one or more zones are marked as stale based on the one or more pruning staleness indicators:
determining that at least one zone, of the plurality of zones, is not stale based on at least one aggregation staleness indicator, and
responsive to said determining that the at least one zone is not stale, deriving the target aggregation of values from at least one per-zone aggregate value, for the at least one zone of the plurality of zones, obtained from the zone map.

19. The one or more non-transitory computer-readable media of claim 18 wherein:
- the at least one per-zone aggregate value comprises a particular per-zone sum value that reflects a sum of values, from the particular column, from rows belonging to an associated zone of the plurality of zones; and
- the target aggregation of values is a target sum of values from the particular column.

20. The one or more non-transitory computer-readable media of claim 19 wherein the query includes a filter condition and the one or more non-transitory computer-readable media further comprises instructions that, when executed by one or more computing devices, cause:
- determining, based on the filter condition, that a first zone of the plurality of zones is a no-overlap zone;
- determining, based on the filter condition, that a second zone of the plurality of zones is a total-overlap zone;
- wherein the particular per-zone sum value reflects a sum of values from rows belonging to the second zone;
- pruning the first zone responsive to determining that the first zone is a no-overlap zone; and
- wherein deriving the target aggregation of values from the particular column comprises using the particular per-zone sum value of the second zone to derive the target sum of values responsive to determining that the second zone is a total-overlap zone.

21. One or more non-transitory computer-readable media storing instructions for improving performance of query execution in a database system based on zone map information, the instructions comprising instructions that, when executed by one or more computing devices, cause:
- dividing, into a plurality of zones, a base table that is managed by a database server;
- wherein the base table has a particular column;
- generating, for the base table, a zone map;
- wherein generating the zone map includes, for each zone of the plurality of zones, storing in the zone map a per-zone aggregate value;
- wherein the per-zone aggregate value is one of:
  - a sum value that reflects a sum of values, from the particular column, from rows belonging to the zone,
  - a min value that reflects a minimum value, from the particular column, from rows belonging to the zone, or
  - a max value that reflects a maximum value, from the particular column, from rows belonging to the zone;
- receiving, by the database server, a query that (a) includes a filter condition, and (b) requires generation of a target aggregation of values from the particular column, and
- in response to receiving the query, deriving the target aggregation of values from the particular column comprising:
  - determining, based on the filter condition, that a first zone of the plurality of zones is a total-overlap zone;
  - determining, based on the filter condition, that a second zone of the plurality of zones is a some-overlap zone;
  - responsive to determining that the second zone is a some-overlap zone, scanning rows of the second zone to compute a particular per-zone aggregate value for values in the particular column for the second zone; and
  - based, at least in part, on said determining that the first zone is a total-overlap zone, combining the per-zone aggregate value of the first zone with at least the particular per-zone aggregate value for the second zone to derive the target aggregation of values.

22. The one or more non-transitory computer-readable media of claim 19 further comprising instructions that, when executed by one or more computing devices, cause:
- maintaining, for each zone of the plurality of zones, validity data that indicates both:
  - whether information for said each zone, in the zone map, is valid with respect to pruning decisions; and
  - whether per-zone sum values for said each zone, in the zone map, are valid for deriving aggregate values to answer queries.

23. The one or more non-transitory computer-readable media of claim 22 further comprising instructions that, when executed by one or more computing devices, cause:
- responsive to a row being inserted into a first zone of the plurality of zones, updating the validity data to indicate that information in the zone map for the first zone is invalid both with respect to pruning decisions and for deriving aggregate values to answer queries; and
- responsive to a row being deleted from a second zone of the plurality of zones, updating the validity data to indicate that information in the zone map for the second zone is invalid for deriving aggregate values to answer queries, but not with respect to pruning decisions.

24. The one or more non-transitory computer-readable media of claim 23 wherein the at least one of the plurality of zones includes only those zones, of the plurality of zones, (a) that are total-overlap zones, and (b) for which validity data indicates the per-zone sum values are valid for deriving aggregate values to answer queries.

25. One or more non-transitory computer-readable media storing instructions for improving performance of query processing in a database system based on zone map information, the instructions comprising instructions that, when executed by one or more processors, cause:
- dividing, into a plurality of zones, a base table that is managed by a database server;
- wherein said dividing is based on locations, in persistent storage, of rows of the base table;
- generating, for the base table, a zone map;
- wherein generating the zone map includes, for each zone of the plurality of zones, storing in the zone map:
  - per-zone range information; and
  - a per-zone aggregate value;
- storing, for each zone of the plurality of zones, at least two per-zone staleness indicators comprising:
  - a pruning staleness indicator indicating whether the zone map includes stale range information for said each zone, and
  - an aggregation staleness indicator indicating whether the zone map includes a stale aggregation value for said each zone;
- wherein each zone of one or more zones, of the plurality of zones, is marked as stale by at least one staleness indicator of the at least two per-zone staleness indicators for said each zone;
- processing, by the database server, a query that targets the base table and requires generation of a target aggregate value;
- wherein the query specifies a filter condition;
- wherein said processing the query comprises:
  - while the one or more zones are marked as stale:
    - determining that a particular zone, of the plurality of zones, is not stale based on a particular aggregation staleness indicator for the particular zone, using the per-zone range information in the zone map to determine that all of the rows, in the particular zone of the plurality of zones, satisfy the filter condition, and responsive to said determining that the particular zone is not stale and responsive to determining that all of the rows in the particular zone satisfy the filter condition, deriving the target aggregate value from the per-zone aggregate value, for the particular zone, obtained from the zone map.

26. One or more non-transitory computer-readable media storing instructions for improving performance of query execution in a database system based on zone map information, the instructions comprising instructions that, when executed by the one or more processors, cause:
dividing, into a plurality of zones, a base table that is managed by a database server;
generating, for the base table, a zone map;
wherein generating the zone map includes, for each zone of the plurality of zones, storing in the zone map;
per-zone range information, and
a per-zone aggregate value;
receiving, by the database server, a query that targets the base table and requires generation of a target aggregate value;
wherein the query specifies a filter condition;
in response to the query, using the per-zone range information in the zone map to determine that a first zone of the plurality of zones is a total-overlap zone relative to the filter condition;
determining, based on the filter condition and the per-zone range information in the zone map, that a second zone of the plurality of zones is a some-overlap zone;
responsive to determining that the second zone is a some-overlap zone, scanning rows of the second zone to compute a particular per-zone aggregate value for the second zone; and
deriving the target aggregate value based, at least in part, on the per-zone aggregate value, for the first zone, obtained from the zone map and the particular per-zone aggregate value for the second zone.

27. The one or more non-transitory computer-readable media of claim 25 wherein the target aggregate value is a sum of values from a particular column of the base table.

28. The one or more non-transitory computer-readable media of claim 25 wherein the target aggregate value is one of:
a minimum value from a particular column of the base table; or
a maximum value from the particular column of the base table.

29. The one or more non-transitory computer-readable media of claim 25 wherein the target aggregate value is an average of values from a particular column of the base table.

30. The one or more non-transitory computer-readable media of claim 25 wherein the target aggregate value is a count of rows, from the base table, that satisfy the filter condition.

31. One or more non-transitory computer-readable media storing instructions for improving performance of query execution in a database system based on zone map information, the instructions comprising instructions which, when executed by one or more computing devices, cause:
dividing, into a plurality of zones, a base table that is managed by a database server;
generating, based on a join between the base table and one or more dimension tables, a join zone map;
wherein the one or more dimension tables include a particular dimension table;
wherein generating the join zone map includes, for each zone of the plurality of zones, storing in the join zone map:
a left-outer-join per-zone aggregate value produced by performing a particular type of aggregation operation on values from a particular column of the base table from rows that are produced by a left-outer-join between the base table and the particular dimension table; and
an inner-join per-zone aggregate value produced by performing the particular type of aggregation operation on values from the particular column of the base table from rows that are produced by an inner-join between the base table and the particular dimension table;
receiving, by the database server, a query that:
specifies a particular type of join between the base table and the particular dimension table; and
requires generation of a target aggregate value based on the particular type of aggregation operation on values from the particular column of the base table from rows that are produced by the particular type of join between the base table and the particular dimension table;
responsive to the particular type of join being a left outer join, deriving the target aggregate value based, at least in part, on the left-outer-join per-zone aggregate value of at least one zone of the plurality of zones;
responsive to the particular type of join being an inner join, deriving the target aggregate value based, at least in part, on the inner-join per-zone aggregate value of at least one zone of the plurality of zones.

32. One or more non-transitory computer-readable media storing instructions for improving performance of query execution in a database system based on zone map information, the instructions comprising instructions which, when executed by one or more computing devices, cause:
dividing, into a plurality of zones, a base table that is managed by a database server;
generating, based on a join between the base table and one or more dimension tables, a join zone map;
wherein the one or more dimension tables include a particular dimension table;
wherein generating the join zone map includes, for each zone of the plurality of zones, storing in the join zone map:
a per-zone aggregate value produced by performing a particular type of aggregation operation on values from a particular column of the base table from rows that are produced by a first type of join between the base table and the particular dimension table; and
a per-zone anti-join row-count value that indicates how many rows of the base table, in the zone, do not combine with rows from the particular dimension table;
receiving, by the database server, a query that:
specifies a second type of join between the base table and the particular dimension table, wherein the second type of join is a different type of join than the first type of join; and
requires generation of a target aggregate value based on the particular type of aggregation operation on values from the particular column of the base table from rows that are produced by the second type of join between the base table and the particular dimension table;

for each zone of the plurality of zones, determining whether the per-zone aggregate value for the zone may be used to produce the target aggregate value based, at least in part, on whether the per-zone anti join row-count value for the zone is zero;

wherein, of the per-zone aggregate values stored in the join zone map, only the per-zone aggregate values of zones where the per-zone anti-join row-count value is zero are used to produce the target aggregate value required by the query.

33. The one or more non-transitory computer-readable media of claim 32 wherein the first type of join is a left outer join and the second type of join is an inner join.

34. The one or more non-transitory computer-readable media of claim 32 wherein the first type of join is an inner join and the second type of join is a left outer join.

35. A method for improving performance of query processing in a database system based on zone map information, comprising:

dividing, into a plurality of zones, a base table that is managed by a database server;
wherein said dividing is based on locations, in persistent storage, of rows of the base table;
wherein the base table has a particular column;
generating, for the base table, a zone map;
wherein generating the zone map includes, for each zone of the plurality of zones, storing in the zone map a per-zone count value;
wherein the per-zone count value reflect one of:
a count of all rows belonging to the zone, or
a count of all rows belonging to the zone that have non-NULL values in the particular column;
wherein one or more of the zones, of the plurality of zones, are marked as stale;
processing, by the database server, a query that:
includes a filter condition, and
requires generation of a target aggregation of values from the particular column; and
wherein said processing the query comprises:
while the one or more zones are marked as stale:
determining, based on the filter condition, that a first zone of the plurality of zones is a no-overlap zone;
determining, based on the filter condition, that a second zone of the plurality of zones is a total-overlap zone;
pruning the first zone responsive to determining that the first zone is a no-overlap zone;
using a per-zone count value of the second zone, obtained from the zone map, to derive the target aggregation of values responsive to determining that the second zone is a total-overlap zone and responsive to determining that the second zone is not stale;
wherein the method is performed by one or more computing devices.

36. One or more non-transitory computer-readable media storing instructions for improving performance of query processing in a database system based on zone map information, the instructions comprising instructions that, when executed by one or more computing devices, cause:

dividing, into a plurality of zones, a base table that is managed by a database server;
wherein said dividing is based on locations, in persistent storage, of rows of the base table;
wherein the base table has a particular column;
generating, for the base table, a zone map;
wherein generating the zone map includes, for each zone of the plurality of zones, storing in the zone map a per-zone count value;
wherein the per-zone count value reflects one of:
a count of all rows belonging to the zone, or
a count of all rows belonging to the zone that have non-NULL values in the particular column;
wherein one or more of the zones, of the plurality of zones, are marked as stale;
processing, by the database server, a query that:
includes a filter condition, and
requires generation of a target aggregation of values from the particular column; and
wherein said processing the query comprises:
while the one or more zones are marked as stale:
determining, based on the filter condition, that a first zone of the plurality of zones is a no-overlap zone,
determining, based on the filter condition, that a second zone of the plurality of zones is a total-overlap zone,
pruning the first zone responsive to determining that the first zone is a no -overlap zone,
determining that the second zone is not stale, and
using a per-zone count value of the second zone, obtained from the zone map, to derive the target aggregation of values responsive to determining that the second zone is a total-overlap zone and responsive to determining that the second zone is not stale.

37. The method of claim 1, wherein for each zone, of the plurality of zones, the rows that belong to said each zone are contiguous on said persistent storage.

38. The one or more non-transitory computer-readable media of claim 18, wherein for each zone, of the plurality of zones, the rows that belong to said each zone are contiguous on said persistent storage.

39. The method of claim 1, further comprising:
storing, for each zone of the plurality of zones, at least two per-zone staleness indicators comprising: a pruning staleness indicator, and an aggregation staleness indicator;
responsive to deletion of data from a first zone of the plurality of zones:
causing the aggregation staleness indicator for the first zone to indicate that the first zone is stale;
wherein the pruning staleness indicator for the first zone remains unchanged responsive to deletion of the data from the first zone;
responsive to addition of data to a second zone of the plurality of zones:
causing the aggregation staleness indicator for the second zone to indicate that the second zone is stale, and
causing the pruning staleness indicator for the second zone to indicate that the second zone is stale.

40. The one or more non-transitory computer-readable media of claim 18, further comprising instructions that, when executed by one or more computing devices, cause:
storing, for each zone of the plurality of zones, at least two per-zone staleness indicators comprising: a pruning staleness indicator, and an aggregation staleness indicator.
responsive to deletion of data from a first zone of the plurality of zones:

causing the aggregation staleness indicator for the first zone to indicate that the first zone is stale;

wherein the pruning staleness indicator for the first zone remains unchanged responsive to deletion of the data from the first zone;

responsive to addition of data to a second zone of the plurality of zones:

causing the aggregation staleness indicator for the second zone to indicate that the second zone is stale, and causing the pruning staleness indicator for the second zone to indicate that the second zone is stale.

* * * * *

UNITED STATES PATENT AND TRADEMARK OFFICE
CERTIFICATE OF CORRECTION

PATENT NO. : 11,354,310 B2  
APPLICATION NO. : 15/987619  
DATED : June 7, 2022  
INVENTOR(S) : Ziauddin Page 1 of 2

It is certified that error appears in the above-identified patent and that said Letters Patent is hereby corrected as shown below:

On the Title Page

Column 2, item (56) under Other Publications, Line 4, delete "htm>." and insert -- html>. --, therefor.

In the Claims

In Column 19, Line 23, in Claim 5, delete "zone" and insert -- zone, --, therefor.

In Column 19, Line 54, in Claim 8, delete "information;" and insert -- information, --, therefor.

In Column 22, Line 15, in Claim 15, delete "anti join" and insert -- anti-join --, therefor.

In Column 22, Line 50, in Claim 18, delete "zone," and insert -- zone; --, therefor.

In Column 23, Line 50, in Claim 21, delete "Column," and insert -- Column; --, therefor.

In Column 24, Line 44, in Claim 25, delete "information;" and insert -- information, --, therefor.

In Column 25, Line 15, in Claim 26, delete "by the one" and insert -- by one --, therefor.

In Column 25, Line 20, in Claim 26, delete "map;" and insert -- map: --, therefor.

In Column 25, Line 62, in Claim 31, delete "which," and insert -- that, --, therefor.

In Column 26, Line 40, in Claim 32, delete "which," and insert -- that, --, therefor.

In Column 27, Line 7, in Claim 32, delete "anti join" and insert -- anti-join --, therefor.

In Column 27, Lines 10-11, in Claim 32, delete "values of zones where" and insert -- values for zones, of the plurality of zones, where --, therefor.

Signed and Sealed this  
Fifteenth Day of November, 2022

Katherine Kelly Vidal  
*Director of the United States Patent and Trademark Office*

CERTIFICATE OF CORRECTION (continued)
U.S. Pat. No. 11,354,310 B2

In Column 27, Line 32, in Claim 35, delete "reflect" and insert -- reflects --, therefor.

In Column 27, Line 45, in Claim 35, delete "zone;" and insert -- zone, --, therefor.

In Column 27, Line 48, in Claim 35, delete "zone;" and insert -- zone, --, therefor.

In Column 27, Line 50, in Claim 35, delete "zone;" and insert -- zone, determining that the second zone is not stale, and --, therefor.

In Column 28, Line 25, in Claim 36, delete "no -overlap" and insert -- no-overlap --, therefor.

In Column 28, Lines 64-65, in Claim 40, delete "indicator." and insert -- indicator; --, therefor.